US010987547B2

(12) United States Patent
Tanaka et al.

(10) Patent No.: US 10,987,547 B2
(45) Date of Patent: *Apr. 27, 2021

(54) GOLF BALL

(71) Applicant: Sumitomo Rubber Industries, Ltd., Kobe (JP)

(72) Inventors: Mami Tanaka, Kobe (JP); Toshiyuki Tarao, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 37 days.

This patent is subject to a terminal disclaimer.

(21) Appl. No.: 16/365,295

(22) Filed: Mar. 26, 2019

(65) Prior Publication Data

US 2019/0217158 A1 Jul. 18, 2019

Related U.S. Application Data

(63) Continuation of application No. 15/592,861, filed on May 11, 2017, now Pat. No. 10,293,214.

(30) Foreign Application Priority Data

May 25, 2016 (JP) .................................. 2016-104567

(51) Int. Cl.
| | |
|---|---|
| *A63B 37/12* | (2006.01) |
| *C08G 18/66* | (2006.01) |
| *C08G 18/48* | (2006.01) |
| *A63B 37/00* | (2006.01) |
| *C08G 18/40* | (2006.01) |
| *C08G 83/00* | (2006.01) |
| *C08L 75/00* | (2006.01) |
| *C08G 18/64* | (2006.01) |
| *C08G 18/75* | (2006.01) |
| *C08G 18/76* | (2006.01) |
| *C08G 18/32* | (2006.01) |
| *C08G 18/42* | (2006.01) |

(52) U.S. Cl.
CPC ...... *A63B 37/0024* (2013.01); *A63B 37/0023* (2013.01); *A63B 37/0031* (2013.01); *A63B 37/0037* (2013.01); *A63B 37/0062* (2013.01); *A63B 37/0063* (2013.01); *A63B 37/0074* (2013.01); *A63B 37/0092* (2013.01); *C08G 18/3206* (2013.01); *C08G 18/4009* (2013.01); *C08G 18/4018* (2013.01); *C08G 18/4277* (2013.01); *C08G 18/4808* (2013.01); *C08G 18/4854* (2013.01); *C08G 18/6484* (2013.01); *C08G 18/6674* (2013.01); *C08G 18/758* (2013.01); *C08G 18/7671* (2013.01); *C08G 83/007* (2013.01); *C08L 75/00* (2013.01); *A63B 37/0029* (2013.01); *A63B 37/0096* (2013.01)

(58) Field of Classification Search
None
See application file for complete search history.

(56) References Cited

U.S. PATENT DOCUMENTS

| | | | |
|---|---|---|---|
| 6,213,894 B1 | 4/2001 | Sullivan et al. | |
| 9,656,126 B2 | 5/2017 | Inoue et al. | |
| 10,293,214 B2 * | 5/2019 | Tanaka | A63B 37/0024 |
| 2002/0045494 A1 | 4/2002 | Isogawa et al. | |
| 2003/0203771 A1 | 10/2003 | Rosenberg et al. | |
| 2004/0010096 A1 | 1/2004 | Rajagopalan et al. | |
| 2004/0220357 A1 | 11/2004 | Wu et al. | |
| 2005/0124777 A1 | 6/2005 | Rosenberg et al. | |
| 2007/0072701 A1 | 3/2007 | Nagasawa | |
| 2009/0170636 A1 | 7/2009 | Kamino et al. | |
| 2009/0264221 A1 | 10/2009 | Tarao | |
| 2012/0292803 A1 | 11/2012 | Nagasawa | |
| 2013/0053179 A1 | 2/2013 | Tarao et al. | |
| 2017/0121524 A1 | 5/2017 | Tanaka et al. | |

FOREIGN PATENT DOCUMENTS

| | | |
|---|---|---|
| JP | 2005-28153 A | 2/2005 |
| JP | 2005-523958 A | 8/2005 |
| JP | 2007-90065 A | 4/2007 |
| JP | 2009-160156 A | 7/2009 |
| JP | 2009-254684 A | 11/2009 |
| WO | WO 2015/159875 A1 | 10/2015 |
| WO | WO2015159875 | * 10/2015 |

OTHER PUBLICATIONS

Advanced Softmaterials SeRM series product list, pp. 1-7 (no date). (Year: 0000).*
Advanced Softmateriais SeRM series product list; pp. 1-7.

* cited by examiner

*Primary Examiner* — David J Buttner
(74) *Attorney, Agent, or Firm* — Birch, Stewart, Kolasch & Birch, LLP (57) ABSTRACT

An object of the present invention is to provide a golf ball having excellent abrasion resistance and spin performance on driver shots. The present invention provides a golf ball having a spherical core and a cover covering the spherical core, wherein the cover contains a polyurethane, wherein the polyurethane comprises, as a constituent component, (A) a polyisocyanate component and (B) a polyol component containing (b1) a polyrotaxane, and wherein (b1) the polyrotaxane has a cyclodextrin, a linear molecule piercing through the cyclic structure of the cyclodextrin, and a blocking group located at both terminals of the linear molecule to prevent disassociation of the cyclodextrin, and at least a part of hydroxyl groups of the cyclodextrin is modified with a caprolactone chain via —O—$C_3H_6$—O— group.

21 Claims, 1 Drawing Sheet

GOLF BALL

CROSS-REFERENCE TO RELATED APPLICATIONS

This application is a Continuation of U.S. application Ser. No. 15/592,861, filed on May 11, 2017 (now U.S. Pat. No. 10,293,214, issued on May 21, 2019), which claims priority under 35 U.S.C. § 119(a) to Application No. 2016-104567, filed in Japan on May 25, 2016, all of which are hereby expressly incorporated by reference into the present application.

FIELD OF THE INVENTION

The present invention relates to a technology for improving a cover of a golf ball, more specifically relates to a technology for improving a polyurethane cover of a golf ball.

DESCRIPTION OF THE RELATED ART

As a resin component constituting a cover of a golf ball, an ionomer resin or a polyurethane is used. The cover containing the ionomer resin is excellent in rebound, durability, processability or the like, thus is widely used. However, the cover containing the ionomer resin has high stiffness and hardness, thus the shot feeling is poor. Furthermore, it is also pointed out that the golf ball comprising the cover containing the ionomer resin fails to exhibit a satisfactory spin performance, and the controllability thereof is inferior. On the other hand, it is well known that shot feeling and spin performance improve if the polyurethane is used as the resin component constituting the cover, compared to the ionomer resin.

For example, JP 2005-523958 A discloses a golf ball comprising a core and a cover, the cover comprising a polyurethane elastomer, the polyurethane elastomer comprising a reaction product of (a) a HDI-terminated prepolymer comprising a reaction product of one or more polyols with a stoichiometric excess of HDI diisocyanate monomer wherein unreacted HDI diisocyanate monomer is removed to less than about 2 wt. % and (b) at least one hydroxyl or amine functional chain extender.

JP 2007-90065 A discloses a golf ball comprising a core and one or more cover layer covering the core, wherein at least one cover layer is formed primarily from a thermoplastic polyurethane elastomer obtained by a curing reaction of a polyurethane undiluted solution containing a polyol component and a polyisocyanate component, and wherein the polyol component includes a copolymeric polycarbonate polyol.

JP 2005-28153 A discloses a multi-piece golf ball that is at least partially formed from a polyurethane or polyurea composition, wherein the polyurethane or polyurea composition comprises at least one diisocyanate, at least one polyol (polyurethane) or amine-terminated compound (polyurea), and at least one curing agent.

JP 2009-160156 A discloses a golf ball comprising a core consisting of a center and at least one intermediate layer covering the center; and a cover covering the core, wherein the cover is formed from a cover composition containing a thermoplastic polyurethane (A), a polyisocyanate compound (B) having two or more isocyanate groups, and a polyhydroxyether (C) as a resin component, wherein the cover composition has a slab hardness in a range from 20 to 55 in Shore D hardness, and the cover has a thickness in a range from 0.1 mm to 1.5 mm.

JP 2009-254684 A discloses a golf ball comprising a core and a cover, wherein the cover is formed from a cover composition containing a thermoplastic polyurethane (A) and a urethane prepolymer (B) having two or more isocyanate groups as a resin component.

SUMMARY OF THE INVENTION

In general, a golf ball having a soft cover is excellent in abrasion resistance, but shows a great spin rate on driver shots, thereby traveling a short flight distance on driver shots. In other words, for the cover of the golf ball, there is a trade-off between the spin performance on driver shots and the abrasion resistance. A cover that is excellent in both of these properties is desirable. The present invention has been made in view of the above circumstances, and an object of the present invention is to provide a golf ball that has a cover using a polyurethane as a resin component and is excellent in the abrasion resistance and the spin performance on driver shots.

The present invention that has solved the above problems provides a golf ball having a spherical core and a cover covering the spherical core, wherein the cover contains a polyurethane and the polyurethane comprises, as a constituent component, (A) a polyisocyanate component and (B) a polyol component containing (b1) a polyrotaxane, and wherein (b1) the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group.

According to the present invention, a golf ball that has a cover using a polyurethane as a resin component and is excellent in the abrasion resistance and the spin performance on driver shots is obtained.

DESCRIPTION OF THE PREFERRED EMBODIMENT

The present invention provides a golf ball having a spherical core and a cover covering the spherical core, wherein the cover contains a polyurethane and the polyurethane comprises, as a constituent component, (A) a polyisocyanate component and (B) a polyol component containing (b1) a polyrotaxane, and wherein (b1) the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group. It is noted that the cover constitutes the outermost layer of the golf ball body (excluding a paint film).

The cover of the golf ball according to the present invention contains a polyurethane as a resin component. The polyurethane comprises, as a constituent component, (A) a polyisocyanate component and (B) a polyol component containing (b1) a polyrotaxane. The polyurethane is a polyurethane obtained by a reaction between (A) the polyisocyanate component and (B) the polyol component containing (b1) the polyrotaxane, and having a plurality of urethane bonds formed in the molecule thereof.

(A) The polyisocyanate component is not particularly limited, as long as it has at least two isocyanate groups, and examples thereof include an aromatic polyisocyanate, an alicyclic polyisocyanate or aliphatic polyisocyanate. Examples of the aromatic polyisocyanate include 2,4-toluene diisocyanate, 2,6-toluene diisocyanate, a mixture of 2,4-toluene diisocyanate and 2,6-toluene diisocyanate (TDI), 4,4'-diphenylmethane diisocyanate (MDI), 1,5-naphthylene diisocyanate (NDI), 3,3'-bitolylene-4,4'-diisocyanate (TODD, xylylene diisocyanate (XDI), tetramethylxylylenediisocyanate (TMXDI), and para-phenylene diisocyanate (PPDI). Examples of the alicyclic polyisocyanate or aliphatic polyisocyanate include 4,4'-dicyclohexylmethane diisocyanate ($H_{12}MDI$), hydrogenated xylylenediisocyanate ($H_6XDI$), hexamethylene diisocyanate (HDI), isophorone diisocyanate (IPDI), and norbornene diisocyanate (NBDI). The polyisocyanate may be used solely or as a mixture of at least two of them.

In view of improving the abrasion resistance, the aromatic polyisocyanate is preferably used as (A) the polyisocyanate component. Use of the aromatic polyisocyanate enhances the mechanical property of the obtained polyurethane and provides a cover having an excellent abrasion resistance. In addition, in view of improving the weather resistance, as (A) the polyisocyanate component, a non-yellowing type polyisocyanate (e.g. TMXDI, XDI, HDI, $H_6XDI$, IPDI, $H_{12}MDI$ and NBDI) is preferably used, 4,4'-dicyclohexylmethane diisocyanate ($H_{12}MDI$) is more preferably used. Since 4,4'-dicyclohexylmethane diisocyanate ($H_{12}MDI$) has a rigid structure, the mechanical property of the resulting polyurethane is enhanced, and thus a cover having an excellent abrasion resistance is obtained.

Next, (B) the polyol component containing (b1) the polyrotaxane will be explained. (b1) The polyrotaxane has a cyclodextrin, a linear molecule piercing through the cyclic structure of the cyclodextrin, and blocking groups located at both terminals of the linear molecule to prevent disassociation of the cyclodextrin. (b1) The polyrotaxane is viscoelastic, since the cyclodextrin molecule is movable along the linear molecule that pierces through the cyclodextrin in a skewering manner (pulley effect). Even if a tension is applied to (b1) the polyrotaxane, the tension can be uniformly dispersed due to the pulley effect. It is noted that, in the present invention, (B) the polyol component is not particularly limited, as long as it has a plurality of hydroxyl groups. (b1) The polyrotaxane is a polyol component, since a plurality of hydroxyl groups which may react with an isocyanate group, exist on the cyclodextrin cyclic structure thereof.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. As the cyclodextrin, one type may be used solely, and two or more types may be used in combination.

The linear molecule is not particularly limited, as long as it is a linear molecule capable of piercing through the cyclic structure of the cyclodextrin so that the cyclic structure of the cyclodextrin is rotatable around the linear molecule. Examples of the linear molecule include polyalkylene, polyester, polyether, and polyacrylic acid. Among them, polyether is preferable, polyethylene glycol is particularly preferable. Polyethylene glycol has less steric hindrance, and thus can easily pierce through the cyclic structure of the cyclodextrin.

The weight average molecular weight of the linear molecule is preferably 5,000 or more, more preferably 6,000 or more, and is preferably 100,000 or less, more preferably 80,000 or less.

The linear molecule preferably has a functional group at both terminals thereof. When the linear molecule has the functional group, the linear molecule can easily react with the blocking group. Examples of the functional group include a hydroxyl group, carboxyl group, amino group, and thiol group.

The blocking group is not particularly limited, as long as it is located at both terminals of the linear molecule to prevent the cyclodextrin from disassociating from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrins which the linear molecule pierces through preferably ranges from 0.06 to 0.61, more preferably ranges from 0.11 to 0.48, even more preferably ranges from 0.24 to 0.41, if the maximum number of the cyclodextrins which the linear molecule pierces through is deemed as 1. This is because if the number of the cyclodextrins is less than 0.06, the pulley effect may not be exerted, and if the number of the cyclodextrins exceeds 0.61, the cyclodextrins are very densely located, so that the movability of the cyclodextrin may decrease.

(b1) The polyrotaxane used in the present invention is a polyrotaxane having at least a part of hydroxyl groups of the cyclodextrin being modified with a caprolactone chain. Modifying with the caprolactone chain enhances the compatibility of (b1) the polyrotaxane with the polyurethane. Further, Modifying with the caprolactone chain enhances the flexibility of (b1) the polyrotaxane, thereby enhancing the spin performance of the golf ball on approach shots.

As the above modification, for example, the hydroxyl groups of the cyclodextrin are treated with propylene oxide to hydroxylpropylate the cyclodextrin, and then ε-caprolactone is added to perform ring-opening polymerization. As a result of this modification, the caprolactone chain —(CO(CH$_2$)$_5$O)nH (n is a natural number ranging from 1 to 100) is linked to the exterior side of the cyclic structure of the cyclodextrin via —O—C$_3$H$_6$—O— group. The above "n" represents the degree of polymerization, and is preferably a natural number ranging from 1 to 100, more preferably a natural number ranging from 2 to 70, even more preferably a natural number ranging from 3 to 40. At the other end of the caprolactone chain, a hydroxyl group is formed through the ring-opening polymerization.

The ratio of the hydroxyl groups modified with the caprolactone chain to all the hydroxyl groups (100 mole %) included in the cyclodextrin before the modification is preferably 2 mole % or more, more preferably 5 mole % or more, even more preferably 10 mole % or more. If the ratio of the hydroxyl groups modified with the caprolactone chain falls within the above range, the flexibility of (b1) the polyrotaxane is greater, and thus the spin performance of the golf ball under a wet condition on approach shots is further enhanced.

Figure 1:
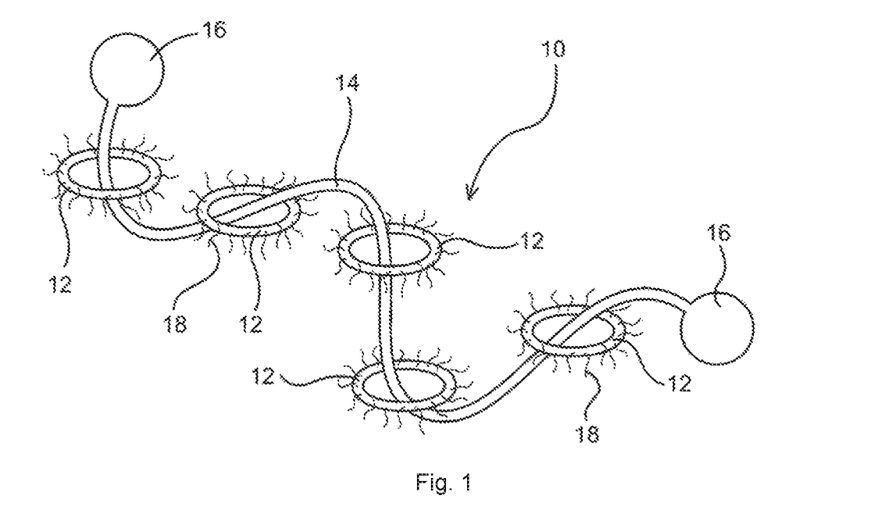
FIG. 1 is a figure illustrating a molecular structure of one example of the polyrotaxane used in the present invention.

FIG. 1 is a figure illustrating a molecular structure of one example of the polyrotaxane used in the present invention. A polyrotaxane 10 has a cyclodextrin 12, a linear molecule 14 piercing through the cyclic structure of the cyclodextrin 12, and blocking groups 16 located at both terminals of the linear molecule 14 to prevent disassociation of the cyclodextrin 12, and a caprolactone chain 18 is linked to the exterior side of the cyclic structure of the cyclodextrin 12 via —O—$C_3H_6$—O— group (not shown).

The hydroxyl value of (b1) the polyrotaxane is preferably 10 mg KOH/g or more, more preferably 15 mg KOH/g or more, even more preferably 20 mg KOH/g or more, and is preferably 400 mg KOH/g or less, more preferably 300 mg KOH/g or less, even more preferably 220 mg KOH/g or less, particularly preferably 180 mg KOH/g or less. If the hydroxyl value of (b1) the polyrotaxane falls within the above range, the compatibility of (b1) the polyrotaxane with the polyurethane elastomer becomes better. It is noted that the hydroxyl value may be measured according to JIS K 1557-1, for example, by an acetylation method.

The total molecular weight of (b1) the polyrotaxane is preferably 30,000 or more, more preferably 40,000 or more, even more preferably 50,000 or more, and is preferably 3,000,000 or less, more preferably 2,500,000 or less, even more preferably 2,000,000 or less, in a weight average molecular weight. If the total weight average molecular weight is 30,000 or more, the resultant cover composition has greater elasticity, and if the total weight average molecular weight is 3,000,000 or less, the resultant cover composition has greater flexibility and thus the spin performance of the golf ball on approach shots becomes better. It is noted that the total weight average molecular weight may be measured, for example, by gel permeation chromatography (GPC) using polystyrene as a standard substance, tetrahydrofuran as an eluant, and an organic solvent system GPC column (e.g., "Shodex (registered trademark) KF series" available from Showa Denko K.K.) as a column.

Specific examples of (b1) the polyrotaxane modified with the polycaprolactone chain include SeRM (registered trademark) super polymer SH3400P, SH2400P, and SH1310P available from Advanced Softmaterials Inc.

(B) The polyol component may further contain (b2) other polyol component. (b2) The other polyol component is not particularly limited, as long as it has a plurality of hydroxyl groups, and examples thereof include a low molecular weight polyol and a high molecular weight polyol.

Examples of the low molecular weight polyol include a diol such as ethylene glycol, diethylene glycol, triethylene glycol, propanediol (e.g. 1,2-propanediol, 1,3-propanediol, 2-methyl-1,3-propanediol, and the like), dipropylene glycol, butanediol (e.g. 1,2-butanediol, 1,3-butanediol, 1,4-butanediol, 2,3-butanediol, 2,3-dimethyl-2,3-butanediol, and the like), neopentyl glycol, pentanediol, hexanediol, heptanediol, octanediol, 1,4-cyclohexanedimethylol, aniline diol, and bisphenol A type diol; a triol such as glycerin, trimethylolpropane, and hexanetriol; and a tetraol or a hexol such as pentaerythritol and sorbitol.

Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol.

The number average molecular weight of the high molecular weight polyol, for example, is preferably 400 or more, more preferably 1,000 or more, without particular limitation. If the number average molecular weight of the high molecular weight polyol is excessively small, the obtained polyurethane is so hard that the shot feeling of the golf ball may be lowered. The upper limit of the number average molecular weight of the high molecular weight polyol is preferably 10,000, more preferably 8,000, without particular limitation. It is noted that the number average molecular weight may be measured by gel permeation chromatography (GPC), using polystyrene as a standard material, tetrahydrofuran as an eluate, and two of TSK-GEL SUPERH2500 (available from Tosoh Corporation) as a column.

Examples of (B) the polyol component include an embodiment where (B) the polyol component consists of (b1) the polyrotaxane; an embodiment where (B) the polyol component consists of (b1) the polyrotaxane and (b2) the high molecular weight polyol; an embodiment where (B) the polyol component consists of (b1) the polyrotaxane and (b2) the low molecular weight polyol; and an embodiment where (B) the polyol component consists of (b1) the polyrotaxane and (b2) the high molecular weight polyol and the low molecular weight polyol. It is noted that the low molecular weight polyol and the high molecular weight polyol may be used solely or as a mixture of at least two of them.

The amount of (b1) the polyrotaxane in the polyurethane is preferably 1 mass % or more, more preferably 3 mass % or more, even more preferably 7 mass % or more. This is because if the amount of (b1) the polyrotaxane is excessively low, its improvement effect in the abrasion resistance is small. In addition, the amount of (b1) the polyrotaxane in the polyurethane is preferably less than 50 mass %, more preferably 30 mass % or less, even more preferably 20 mass % or less. This is because if the amount of (b1) the polyrotaxane is excessively high, a gel may be formed during the synthesis of the polyurethane.

In the polyurethane, the constituent ratio of (A) the polyisocyanate component to (B) the polyol component, i.e. the molar ratio (NCO/OH) of the isocyanate group (NCO) in (A) the polyisocyanate component to the hydroxyl group (OH) in (B) the polyol component is preferably 0.7 or more, more preferably 0.8 or more, even more preferably 0.9 or more, and is preferably 1.0 or less, more preferably less than 1.0, even more preferably 0.99 or less. In addition, when (B) the polyol component further contains (b2) the other polyol component than (b1) the polyrotaxane, the molar ratio (NCO/OH) of the isocyanate group (NCO) in (A) the polyisocyanate component to the hydroxyl group (OH) in (b2) the other polyol component is preferably 0.8 or more and 1.2 or less, and more preferably 1.0.

The polyurethane used in the present invention may further comprise a polyamine as a constituent component, in addition to (A) the polyisocyanate component and (B) the polyol component. The polyamine is not particularly limited, as long as it has at least two amine groups. Examples of the polyamine include an aliphatic polyamine, an alicyclic polyamine, and an aromatic polyamine. Examples of the aliphatic polyamine include ethylenediamine, propylenediamine, butylenediamine, and hexamethylenediamine. Examples of the alicyclic polyamine include isophoronediamine and piperazine.

The aromatic polyamine is not particularly limited, as long as it has at least two amino groups directly or indirectly bonded to an aromatic ring. Herein, the "indirectly bonded to an aromatic ring" means that the amino group is bonded to an aromatic ring via, for example, a lower alkylene group. The aromatic polyamine may be, for example, a monocyclic aromatic polyamine having at least two amino groups bonded to one aromatic ring, or a polycyclic aromatic polyamine having at least two aminophenyl groups each having at least one amino group bonded to one aromatic ring.

Examples of the monocyclic aromatic polyamine include a type wherein amino groups are directly bonded to an aromatic ring, such as phenylenediamine, tolylenediamine, diethyltoluenediamine, and dimethylthiotoluenediamine; and a type wherein amino groups are bonded to an aromatic ring via a lower alkylene group, such as xylylenediamine. Further, the polycyclic aromatic polyamine may be either a poly(aminobenzene) having at least two aminophenyl groups directly bonded to each other, or a compound having at least two aminophenyl groups bonded to each other via a lower alkylene group or an alkylene oxide group. Among them, a diaminodiphenylalkane having two aminophenyl groups bonded to each other via a lower alkylene group is preferable, 4,4'-diaminodiphenylmethane and a derivative thereof are particularly preferable.

The constitutional embodiment of the polyurethane used in the present invention is not particularly limited, and examples thereof include an embodiment where the polyurethane is formed from (A) the polyisocyanate component and (b1) the polyrotaxane; an embodiment where the polyurethane is formed from (A) the polyisocyanate component, (b1) the polyrotaxane and (b2) the high molecular weight polyol component; and an embodiment where the polyurethane is formed from (A) the polyisocyanate component, (b1) the polyrotaxane, and (b2) the high molecular weight polyol component and the low molecular weight polyol component.

The polyurethane may be either a thermoplastic polyurethane or a thermosetting polyurethane. The thermoplastic polyurethane is a polyurethane exhibiting plasticity by heating and generally means a polyurethane having a linear chain structure of a high-molecular weight to a certain extent. The thermosetting polyurethane is a polyurethane obtained through a curing reaction between a relatively low molecular weight prepolymer and a curing agent when using. By controlling the number of the functional group of the prepolymer or the curing agent to be used, a thermosetting polyurethane having a three-dimensional crosslinked structure is obtained. As the polyurethane used in the present invention, a thermoplastic polyurethane is preferred. This is because if the thermoplastic polyurethane is used, the cover can be easily molded.

Examples of the method for synthesizing the polyurethane used in the present invention include a one-shot method and a prepolymer method. The one-shot method is a method of reacting a polyisocyanate component and a polyol component or the like at one time. The prepolymer method is a method of reacting a polyisocyanate component and a polyol component or the like in multiple steps, e.g. a method of synthesizing a urethane prepolymer having a relatively low molecular weight, followed by further polymerization to have a higher molecular weight.

Next, the method for synthesizing the polyurethane used in the present invention by the one-shot method will be described. In the one-shot method, the polyurethane is synthesized by reacting (A) the polyisocyanate component and (B) the polyol component containing (b1) the polyrotaxane.

The temperature at which the synthesis reaction of the polyurethane is carried out is preferably 10° C. or more, more preferably 30° C. or more, even more preferably 50° C. or more, and is preferably 200° C. or less, more preferably 150° C. or less, even more preferably 100° C. or less. In addition, the reaction time for the synthesis reaction of the polyurethane is preferably 10 minutes or more, more preferably 1 hour or more, even more preferably 3 hours or more, and is preferably 32 hours or less, more preferably 16 hours or less, even more preferably 8 hours or less.

The synthesis reaction of the polyurethane is preferably conducted in an atmosphere of dry nitrogen.

In synthesizing the polyurethane, a publicly known catalyst may be used. Examples of the catalyst include a monoamine such as triethylamine and N,N-dimethylcyclohexylamine; a polyamine such as N, N, N',N'-tetramethylethylene diamine and N,N,N',N'',N''-pentamethyldiethylene triamine; a cyclic diamine such as 1,8-diazabicyclo-[5.4.0]-7-undecene (DBU) and triethylenediamine; and a tin-based catalyst such as dibutyl tin dilaurylate and dibutyl tin diacetate. These catalysts may be used solely, or two or more of these catalysts may be used in combination. Among them, the tin-based catalyst such as dibutyl tin dilaurylate and dibutyl tin diacetate is preferable, and in particular, dibutyl tin dilaurylate is preferably used.

The cover of the golf ball according to the present invention is formed from a cover composition containing the above polyurethane as a resin component. The cover composition may further contain another resin component, as long as it does not impair the inventive effect. Examples of another resin component include an ionomer resin and a thermoplastic elastomer. The ionomer resin includes, for example, a product prepared by neutralizing at least a part of carboxyl groups in a binary copolymer composed of ethylene and an α,β-unsaturated carboxylic acid having 3 to 8 carbon atoms with a metal ion; a product prepared by neutralizing at least a part of carboxyl groups in a ternary copolymer composed of ethylene, an α,β-unsaturated carboxylic acid having 3 to 8 carbon atoms and an α,β-unsaturated carboxylic acid ester with a metal ion, or a mixture of those. Specific examples of the ionomer resin include "Himilan (registered trademark)" available from Du Pont-Mitsui Polychemicals Co., Ltd., "Surlyn (registered trademark)" available from E.I.

du Pont de Nemours and Company, and "Iotek (registered trademark)" available from ExxonMobil Chemical Corporation. Specific examples of the thermoplastic elastomer include a thermoplastic polyurethane elastomer having a trade name of "Elastollan (registered trademark) (e.g, "Elastollan XNY88A")" available from BASF Japan Ltd., a thermoplastic polyamide elastomer having a trade name of "Pebax (registered trademark) (e.g. "Pebax 2533")" available from Arkema K. K.; a thermoplastic polyester elastomer having a trade name of "Hytrel (registered trademark) (e.g. "Hytrel 3548", "Hytrel 4047")" available from Du Pont-Toray Co., Ltd.; and a thermoplastic polystyrene elastomer having a trade name of "Rabalon (registered trademark)" available from Mitsubishi Chemical Corporation.

In the case that another resin component is used as the resin component constituting the cover composition, the amount of the above polyurethane in the total resin component is preferably 85 mass % or more, more preferably 90 mass % or more, even more preferably 95 mass % or more. The resin component may consist of the above polyurethane.

The cover composition may further contain a pigment component such as titanium oxide, a blue pigment or the like; a weight adjusting agent such as calcium carbonate, barium sulfate or the like; a dispersant; an antioxidant; an ultraviolet absorber; a light stabilizer; a fluorescent material or a fluorescent brightener; and the like, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. Further, if the amount of the white pigment exceeds 10 parts by mass, the durability of the obtained cover may deteriorate.

The loss modulus of elasticity E" of the cover is preferably $4.5 \times 10^7$ Pa or less, more preferably $4.2 \times 10^7$ Pa or less, even more preferably $4.0 \times 10^7$ Pa or less, and is preferably $8.0 \times 10^6$ Pa or more, more preferably $9.0 \times 10^6$ Pa or more, even more preferably $9.5 \times 10^6$ Pa or more. If the loss modulus of elasticity E" of the cover is $8.0 \times 10^6$ Pa or more, the spin rate on driver shots is further lowered, and if the loss modulus of elasticity E" of the cover is $4.5 \times 10^7$ Pa or less, the spin rate on approach shots is further increased. The method for measuring the loss modulus of elasticity of the cover will be described later.

The pencil hardness of the cover is preferably H or more, more preferably 2H or more, even more preferably 3H or more, and is preferably 9H or less, more preferably 8H or less, even more preferably 7H or less. If the pencil hardness of the cover is H or more, the spin rate on driver shots is further lowered, and if the pencil hardness of the cover is 9H or less, the spin rate on approach shots is further increased. The method for measuring the pencil hardness of the cover will be described later.

The slab hardness of the cover composition is preferably 74 or more, more preferably 76 or more, even more preferably 78 or more, and is preferably 94 or less, more preferably 92 or less, even more preferably 90 or less in Shore A hardness. If the slab hardness of the cover composition is 74 or more in Shore A hardness, the spin rate on driver shots is further lowered, and if the slab hardness of the cover composition is 94 or less in Shore A hardness, the spin rate on approach shots is further increased.

The cover composition may be obtained, for example, by dry blending the above polyurethane and the additives that are blended where necessary. Further, the dry blended mixture may be extruded into a pellet form. In the dry blending, for example, a mixer capable of blending raw materials in a pellet form is preferably used, a tumbler type mixer is more preferably used. The extrusion can be carried out using a publicly known extruder such as a single-screw extruder, a twin-screw extruder, and a twin-screw/single-screw extruder.

[Golf Ball]

The construction of the golf ball of the present invention is not particularly limited, as long as it is a golf ball comprising a spherical core and a cover covering the spherical core. Examples of the construction of the golf ball include a two-piece golf ball having a single layered spherical core and a cover covering the spherical core; a three-piece golf ball having a spherical core composed of a center and a single layered intermediate layer covering the center, and a cover covering the spherical core; a multi-piece golf ball having a spherical core composed of a center and two or more intermediate layers covering the center, and a cover covering the spherical core; and the like.

The core or center may employ a conventionally known rubber composition (hereinafter simply referred to as "core rubber composition" occasionally), and may be formed by heat pressing, for example, a rubber composition containing a base rubber, a co-crosslinking agent and a crosslinking initiator.

As the base rubber, particularly preferred is a high cis-polybutadiene having a cis-bond in a proportion of 40 mass % or more, more preferably 70 mass % or more, and even more preferably 90 mass % or more in view of its superior resilience. As the co-crosslinking agent, an $\alpha,\beta$-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 20 parts by mass or more and 50 parts by mass or less with respect to 100 parts by mass of the base rubber. In the case that the $\alpha,\beta$-unsaturated carboxylic acid having 3 to 8 carbon atoms is used as the co-crosslinking agent, a metal compound (e.g. magnesium oxide) is preferably used. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferably used. The amount of the crosslinking initiator is preferably 0.2 part by mass or more, more preferably 0.3 part by mass or more, and is preferably 5 parts by mass or less, more preferably 3 parts by mass or less, with respect to 100 parts by mass of the base rubber.

In addition, the core rubber composition may further contain an organic sulfur compound. As the organic sulfur compound, diphenyl disulfides, thiophenols or thionaphthols are preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferred. As the carboxylic acid, an aliphatic carboxylic acid or an aromatic carboxylic acid (e.g. benzoic acid) may be used. The amount of the carboxylic acid and/or the salt thereof is preferably 1 part by mass or more and 40 parts by mass or less with respect to 100 parts by mass of the base rubber.

The core rubber composition may further contain a weight adjusting agent such as zinc oxide and barium sulfate, an antioxidant, or a colored powder, in addition to the base rubber, the co-crosslinking agent, the crosslinking initiator, and the organic sulfur compound. The molding conditions for heat pressing the core rubber composition may be determined appropriately depending on the rubber formulation. Generally, the heat pressing is preferably carried out at 130° C. to 200° C. for 10 to 60 minutes, or carried out in a two-step heating of heating at 130° C. to 150° C. for 20 to 40 minutes followed by heating at 160° C. to 180° C. for 5 to 15 minutes.

In the case that the spherical core has an intermediate layer, examples of the intermediate layer material include a thermoplastic resin such as a polyurethane resin, an ionomer resin, a polyamide resin, and polyethylene; a thermoplastic elastomer such as a styrene elastomer, a polyolefin elastomer, a polyurethane elastomer, a polyamide elastomer, and a polyester elastomer; and a cured product of a rubber composition. Herein, examples of the ionomer resin include a product prepared by neutralizing at least a part of carboxyl groups in a binary copolymer composed of ethylene and an α,β-unsaturated carboxylic acid with a metal ion; and a product prepared by neutralizing at least a part of carboxyl groups in a ternary copolymer composed of ethylene, an α,β-unsaturated carboxylic acid and an α,β-unsaturated carboxylic acid ester with a metal ion. The intermediate layer may further contain a weight adjusting agent such as barium sulfate and tungsten, an antioxidant, and a pigment.

The method for forming the intermediate layer is not particularly limited, and examples thereof include a method which comprises molding the intermediate layer composition into hemispherical half shells in advance, covering the spherical body with two of the half shells, and subjecting the spherical body with two of the half shells to the compression molding; and a method which comprises injection molding the intermediate layer composition directly onto the spherical body so as to cover the spherical body.

In case of injection molding the intermediate layer composition onto the spherical body to form the intermediate layer, it is preferred to use upper and lower molds, each having a hemispherical cavity, for forming the intermediate layer.

When molding the intermediate layer by the injection molding, the hold pin is protruded to hold the spherical body, and the heated and melted intermediate layer composition is charged and then cooled to obtain the intermediate layer.

When molding the intermediate layer in the compression molding method, molding of the half shell may be conducted by either a compression molding method or an injection molding method, and the compression molding method is preferable. The compression molding of the intermediate layer composition into the half shell can be carried out, for example, under a pressure of 1 MPa or more and 20 MPa or less at a temperature of −20° C. or more and 70° C. or less relative to the flow beginning temperature of the intermediate layer composition. By performing the molding under the above conditions, a half shell having a uniform thickness can be formed. Examples of the method for molding the intermediate layer using half shells include a method of covering the spherical body with two of the half shells and then subjecting the spherical core with two of the half shells to the compression molding. The compression molding of the half shells into the intermediate layer can be carried out, for example, under a pressure of 0.5 MPa or more and 25 MPa or less at a temperature of −20° C. or more and 70° C. or less relative to the flow beginning temperature of the intermediate layer composition. By performing the molding under the above conditions, an intermediate layer having a uniform thickness can be formed.

It is noted that the molding temperature means the highest temperature where the temperature at the surface of the concave portion of the lower mold reaches from closing the mold to opening the mold. In addition, the flow beginning temperature of the composition may be measured using the thermoplastic resin composition in a pellet form under the following conditions with "Flow Tester CFT-500" available from Shimadzu Corporation.

Measuring conditions: plunger area: 1 cm$^2$, die length: 1 mm, die diameter: 1 mm, load: 588.399 N, starting temperature: 30° C., and temperature increase rate: 3° C./min.

The center hardness Ho of the spherical core is preferably 40 or more, more preferably 45 or more, and even more preferably 50 or more in Shore C hardness. If the center hardness Ho of the spherical core is less than 40 in Shore C hardness, the spherical core becomes so soft that the resilience thereof may be lowered. In addition, the center hardness Ho of the spherical core is preferably 70 or less, more preferably 65 or less, and even more preferably 60 or less in Shore C hardness. If the center hardness Ho exceeds 70 in Shore C hardness, the spherical core becomes so hard that the shot feeling thereof may be lowered.

The surface hardness Hs of the spherical core is preferably 65 or more, more preferably 70 or more, even more preferably 75 or more, and is preferably 100 or less, more preferably 95 or less, even more preferably 90 or less in Shore C hardness. If the surface hardness of the spherical core is 65 or more in Shore C hardness, the spherical core does not become excessively soft, and thus a better resilience is obtained. In addition, if the surface hardness of the spherical core is 100 or less in Shore C hardness, the spherical core does not become excessively hard, and thus a better shot feeling is obtained.

The hardness difference (Hs-Ho) between the surface hardness Hs and the center hardness Ho of the spherical core is preferably 10 or more, more preferably 12 or more, even more preferably 15 or more, and is preferably 40 or less, more preferably 35 or less, even more preferably 30 or less in Shore C hardness. If the hardness difference between the core surface and the core center is great, the obtained golf ball has a higher launch angle and a lower spin rate on driver shots, and thus travels a greater flight distance.

The spherical core preferably has a diameter of 34.8 mm or more, more preferably 36.8 mm or more, even more preferably 38.8 mm or more, and preferably has a diameter of 42.2 mm or less, more preferably 41.8 mm or less, even more preferably 41.2 mm or less, most preferably 40.8 mm or less. If the spherical core has a diameter of 34.8 mm or more, the thickness of the cover does not become too thick and thus the resilience becomes better. On the other hand, if the spherical core has a diameter of 42.2 mm or less, the thickness of the cover does not become too thin and thus the cover functions better.

When the spherical core has a diameter in a range from 34.8 mm to 42.2 mm, the compression deformation amount of the spherical core (shrinking amount of the spherical core along the compression direction) when applying a load from 98 N as an initial load to 1275 N as a final load to the spherical core is preferably 2.0 mm or more, more preferably 2.8 mm or more, and is preferably 6.0 mm or less, more preferably 5.0 mm or less, even more preferably 4.5 mm or less. If the compression deformation amount is 2.0 mm or more, the shot feeling becomes better, and if the compression deformation amount is 6.0 mm or less, the resilience becomes higher.

The embodiment for molding the cover composition into the cover includes, without any limitation, an embodiment which comprises injection molding the cover composition directly onto the spherical core, and an embodiment which comprises molding the cover composition into a hollow-shell, covering the spherical core with a plurality of the hollow-shells and subjecting the spherical core with a plurality of the hollow shells to the compression molding (preferably an embodiment which comprises molding the cover composition into a half hollow-shell, covering the spherical core with two of the half hollow-shells, and subjecting the spherical core with two of the half hollow-shells to the compression molding). The golf ball body having the cover formed thereon is ejected from the mold, and is preferably subjected to surface treatments such as deburring, cleaning and sandblast where necessary. In addition, if desired, a mark may be formed.

The thickness of the cover is preferably 0.3 mm or more, more preferably 0.4 mm or more, even more preferably 0.5 mm or more, and is preferably 2.0 mm or less, more preferably 1.5 mm or less, even more preferably 1.0 mm or less. If the thickness of the cover is 0.3 mm or more, the cover is easily molded, and if the thickness of the cover is 2.0 mm or less, the resilience performance of the golf ball becomes better since the core has a relatively large diameter.

The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape.

The shape of dimples is employed solely or at least two of them may be used in combination.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

The golf ball of the present invention preferably has a diameter ranging from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball of the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball of the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.4 mm or more, even more preferably 2.5 mm or more, most preferably 2.8 mm or more, and is preferably 5.0 mm or less, more preferably 4.5 mm or less. If the compression deformation amount is 2.0 mm or more, the golf ball does not become excessively hard, and thus the shot feeling thereof becomes better. On the other hand, if the compression deformation amount is 5.0 mm or less, the resilience of the golf ball becomes higher.

Figure 2:
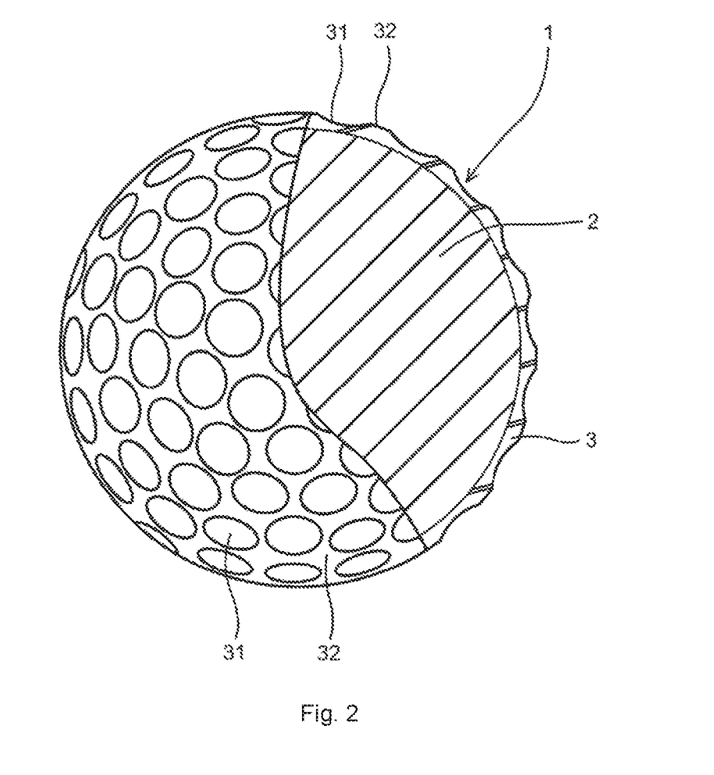
FIG. 2 is a partially cutaway sectional view showing a golf ball according to one embodiment of the present invention.

FIG. 2 is a partially cutaway sectional view showing a golf ball 1 according to an embodiment of the present invention. The golf ball 1 comprises a spherical core 2, and a cover 3 disposed outside the spherical core 2. A plurality of dimples 31 are formed on the surface of the cover 3. Other portion than the dimples 31 on the surface of the cover 3 is a land 32. The cover 3 is formed from the above-mentioned cover composition.

EXAMPLES

Next, the present invention will be described in detail by way of examples. However, the present invention is not limited to the examples described below. Various changes and modifications without departing from the spirit of the present invention are included in the scope of the present invention.

Evaluation Methods (1) Compression Deformation Amount (mm)

A compression deformation amount of the core (a shrinking amount of the core along the compression direction), when applying a load from an initial load of 98 N to a final load of 1275 N to the core, was measured.

(2) Core Hardness (Shore C Hardness)

The hardness measured on the surface of the core was adopted as the surface hardness of the core. In addition, the hardness measured at the central point of a cut plane which was obtained by cutting the core into two hemispheres, was adopted as the center hardness of the core. The hardness was measured with an automatic hardness tester (Digitest II, available from Bareiss company) using a testing device of "Shore C".

(3) Slab Hardness (Shore A Hardness)

Sheets with a thickness of about 2 mm were produced by injection molding the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore A".

(4) Pencil Hardness

A sheet with a thickness of 2 mm, a width of 2 cm and a length of 5 cm was produced by injection molding the cover composition. The pencil hardness of the sheet was measure according to JIS K 5600-5-4.

(5) Measurement of Loss Modulus of Elasticity E" (Pa)

The loss modulus of elasticity E" (Pa) of the cover composition was measured under the following conditions.

Apparatus: a dynamic viscoelasticity analyzer "Rheogel-E4000" available from UBM Co., Ltd.

Testing sample: a sheet with a thickness of 0.5 mm was produced by heat pressing the cover composition, and a test piece was cut out from the sheet such that the test piece has a width of 4 mm and a length between the clamps of 20 mm.
Measuring mode: tensile mode
Measuring temperature: 0° C.
Oscillation frequency: 10 Hz
Measuring strain: 0.05%

(6) Abrasion Resistance

A commercially available sand wedge (Trade name: New-Bread Tour Forged, Shaft hardness: S, available from Sumitomo Rubber Industries, Ltd.) was installed on a swing robot available from Golf Laboratories, Inc., and each golf ball was hit at a head speed of 36 m/sec. Each hit area of the golf ball was observed, and the abrasion resistance was evaluated according to the following four grade scoring standard. It is noted that a lower score indicates a higher abrasion resistance.

Scoring Standard

0: Nearly no scratch occurred on the surface of the golf ball.
1: Only a little scratch occurred on the surface of the golf ball.
2: The surface of the golf ball was slightly shaved, and fuzz occurred thereon.
3: The surface of the golf ball was shaved, and fuzz remarkably occurred thereon.

(7) Spin Rate on Driver Shots

A driver provided with a titanium head (Trade name: SRIXON Z745, Loft angel: 8.5°, available from Dunlop Sports Limited) was installed on a swing robot M/C available from True Temper Sports, Inc. The golf ball was hit at a head speed of 50 m/sec, and the spin rate of the golf ball right after the hitting was measured. The measurement was conducted ten times for each golf ball, and the average value thereof was adopted as the measurement value of the golf ball. It is noted that the spin rate of the golf ball right after the hitting was measured by continuously taking a sequence of photographs of the hit golf ball.

(8) Moldability

A half shell (thickness: 0.5 mm) was produced by compression molding the cover composition, and a broken or missing part in the half shell when ejecting the half shell from the mold was visually evaluated. The compression molding was conducted under the conditions of a molding temperature of 170° C., a molding time of 5 minutes and a molding pressure of 2.94 MPa. The case that neither broken nor missing part was found in the produced half shell was evaluated as "G (good)", and the case that a broken or missing part was found in the produced half shell was evaluated as "P (poor)".

Synthesis of Polyurethane

TABLE 1

| | Golf ball No. | 1 | 2 | 3 | 4 | 5 | 6 | 7 | 8 |
|---|---|---|---|---|---|---|---|---|---|
| Cover composition | (A) Polyisocyanate: $H_{12}$MDI | 304 | 288 | 256 | 314 | 297 | 264 | 320 | 303 |
| | (A) Polyisocyanate: MDI | — | — | — | — | — | — | — | — |
| | (b1) Polyrotaxane | 50 | 100 | 200 | 50 | 100 | 200 | 50 | 100 |
| | (b2) High molecular weight polyol | 579 | 549 | 488 | 565 | 535 | 476 | 556 | 527 |
| | (b2) Low molecular weight polyol | 67 | 63 | 56 | 71 | 68 | 60 | 74 | 70 |
| | Molar ratio NCO/OH (A/b2) | 1 | 1 | 1 | 1 | 1 | 1 | 1 | 1 |
| | Molar ratio NCO/OH (A/(b1 + b2)) | 0.97 | 0.94 | 0.88 | 0.97 | 0.94 | 0.88 | 0.97 | 0.94 |
| | Amount of (b1) polyrotaxane in polyurethane (mass %) | 5 | 10 | 20 | 5 | 10 | 20 | 5 | 10 |
| | Titanium oxide (amount with respect to 100 parts by mass of resin component) | 4 | 4 | 4 | 4 | 4 | 4 | 4 | 4 |
| Physical properties | Slab hardness of cover composition (Shore A) | 82 | 82 | 82 | 84 | 84 | 84 | 88 | 88 |
| | Loss modulus of elasticity E" of cover composition ($\times 10^7$ Pa) | 2.97 | 1.26 | 1.01 | 3.62 | 2.01 | 1.74 | 4.10 | 2.52 |
| | Pencil hardness of cover composition | 7H | 9H | 9H | 5H | 6H | 6H | 2H | 4H |
| Evaluation | Moldability of cover | G | G | G | G | G | G | G | G |
| | Abrasion resistance | 0 | 0 | 0 | 1 | 1 | 1 | 2 | 1 |
| | Spin performance on driver shots (rpm) | 2270 | 2290 | 2300 | 2230 | 2240 | 2240 | 2050 | 2065 |

| | Golf ball No. | 9 | 10 | 11 | 12 | 13 |
|---|---|---|---|---|---|---|
| Cover composition | (A) Polyisocyanate: $H_{12}$MDI | 270 | — | — | — | 160 |
| | (A) Polyisocyanate: MDI | — | 339 | 321 | 286 | — |
| | (b1) Polyrotaxane | 200 | 50 | 100 | 200 | 500 |
| | (b2) High molecular weight polyol | 468 | 522 | 495 | 440 | 305 |
| | (b2) Low molecular weight polyol | 62 | 89 | 84 | 74 | 35 |
| | Molar ratio NCO/OH (A/b2) | 1 | 1 | 1 | 1 | 1 |
| | Molar ratio NCO/OH (A/(b1 + b2)) | 0.89 | 0.98 | 0.95 | 0.89 | 0.64 |
| | Amount of (b1) polyrotaxane in polyurethane (mass %) | 20 | 5 | 10 | 20 | 50 |
| | Titanium oxide (amount with respect to 100 parts by mass of resin component) | 4 | 4 | 4 | 4 | 4 |

TABLE 1-continued

| | | | | | | |
|---|---|---|---|---|---|---|
| Physical properties | Slab hardness of cover composition (Shore A) | 88 | 90 | 90 | 90 | — |
| | Loss modulus of elasticity E" of cover composition (×$10^7$ Pa) | 2.18 | 1.01 | 0.88 | 0.75 | — |
| | Pencil hardness of cover composition | 5H | H | 2H | 3H | — |
| Evaluation | Moldability of cover | G | G | G | G | Gel was formed |
| | Abrasion resistance | 1 | 2 | 2 | 2 | — |
| | Spin performance on driver shots (rpm) | 2070 | 2315 | 2320 | 2330 | — |

*)Amount of (A), (b1), (b2) is shown by "parts by mass", respectively.

The polyurethane was synthesized as follows according to the formulations shown in Table 1. The polyrotaxane, polyoxytetramethylene glycol and 1,4-butanediol were weighed by a determined amount, added into a steel container, and heated at 105° C. for three hours under an airtight condition. Then, a stirring rod and a temperature sensor were installed in the steel container, and stirring was carried out at 200 rpm. The polyisocyanate in a determined amount was added therein, and the stirring was continued until the temperature of the temperature sensor reached 130° C. After the temperature reached 130° C., the reaction product was immediately poured into a mold made of Teflon (registered trademark). An annealing treatment of the reaction product was carried out at 100° C. for 15 hours in a state of being poured into the mold made of Teflon (registered trademark). After the annealing treatment, the cured sample was finely pulverized.

(A) Polyisocyanate: 4,4'-dicyclohexylmethane diisocyanate ($H_{12}$MDI)

(A) Polyisocyanate: diphenylmethane diisocyanate (MDI)

(b1) Polyrotaxane: "SeRM (registered trademark) super polymer SH2400P (a polyrotaxane having a cyclodextrin, at least a part of hydroxyl groups of the cyclodextrin being modified with a caprolactone chain via —O—$C_3H_6$—O— group, a linear molecule of polyethylene glycol and a blocking group of an adamantyl group; molecular weight of linear molecule: 20,000; hydroxyl value of polyrotaxane: 76 mg KOH/g; total molecular weight of polyrotaxane: 400,000 in weight average molecular weight)" available from Advanced Softmaterials Inc.

(b2) High molecular weight polyol: mixture of PTMG 1000 (polyoxytetramethylene glycol having number average molecular weight of 1000) and PTMG 2000 (polyoxytetramethylene glycol having number average molecular weight of 2000) in a ratio of PTMG 1000: PTMG 2000=6:4

(b2) Low molecular weight polyol: butanediol

Production of Golf Ball (1) Production of Core

The center rubber composition having the formulation shown in Table 2 was kneaded, and heat pressed in upper and lower molds, each having a hemispherical cavity, at 170° C. for 15 minutes to obtain a spherical center (diameter: 38.5 mm). Then, the intermediate layer material having the formulation shown in Table 2 was extruded with a twin-screw kneading extruder to prepare an intermediate layer composition in a pellet form. The extruding conditions of the intermediate layer composition were a screw diameter of 45 mm, a screw rotational speed of 200 rpm, and screw L/D=35, and the mixture was heated to 150 to 230° C. at the die position of the extruder. The obtained intermediate layer composition was injection molded onto the center obtained above to produce a spherical core (diameter: 41.7 mm) having a center and an intermediate layer covering the center.

TABLE 2

| | Spherical core | | |
|---|---|---|---|
| Center | Formulation | Polybutadiene rubber | 100 |
| | (parts by mass) | Zinc acrylate | 38 |
| | | Zinc oxide | 5 |
| | | Diphenyl disulfide | 0.5 |
| | | Dicumyl peroxide | 1 |
| | Diameter (mm) | | 38.5 |
| Intermediate layer | Formulation (parts by mass) | Himilan 1605 | 50 |
| | | Himilan AM7329 | 50 |
| | Slab hardness (Shore D) | | 64 |
| | Thickness (mm) | | 1.6 |
| Physical properties | Diameter (mm) | | 41.7 |
| | Surface hardness (Shore C) | | 98 |
| | Center hardness (Shore C) | | 65 |
| | Hardness difference (surface hardness − center hardness) (Shore C) | | 33 |
| | Compression deformation amount (mm) | | 2.55 |

Polybutadiene rubber: "BR730 (high cis-polybutadiene)" available from JSR Corporation Zinc acrylate: "ZNDA-90S" available from Nisshoku Techno Fine Chemical Co., Ltd.

Zinc oxide: "Ginrei R" available from Toho Zinc Co., Ltd.

Diphenyl disulfide: available from Sumitomo Seika Chemicals Co., Ltd.

Dicumyl peroxide: "Percumyl (register trademark) D" available from NOF Corporation Himilan (registered trademark) 1605: sodium ion neutralized ethylene-methacrylic acid copolymer ionomer resin available from Du Pont-Mitsui Polychemicals Co., Ltd.

Himilan AM7329: zinc ion neutralized ethylene-methacrylic acid copolymer ionomer resin available from Du Pont-Mitsui Polychemicals Co., Ltd.

(2) Molding of Half Shells

The polyurethane synthesized according to the formulation shown in Table 1 and titanium oxide were dry blended and mixed with a twin-screw kneading extruder to prepare the cover composition in a pellet form, according to the formulation shown in Table 1. A polyurethane and titanium oxide were dry blended and mixed with a twin-screw kneading extruder to prepare the cover composition in a pellet form, according to the formulation shown in Table 3. The extruding conditions of the cover composition were a screw diameter of 45 mm, a screw rotational speed of 200 rpm, and screw L/D=35, and the mixture was heated to 150 to 230° C. at the die position of the extruder. The compression molding of half shells was conducted by charging the obtained cover composition in the pellet form one by one into each of the depressed part of the lower mold of the mold for molding half shells, and applying pressure to mold the half shells. The compression molding was conducted under the conditions of a molding temperature of 170° C., a molding time of 5 minutes and a molding pressure of 2.94 MPa.

TABLE 3

| | Golf ball No. | 14 | 15 | 16 | 17 | 18 | 19 |
|---|---|---|---|---|---|---|---|
| Cover composition | Elastollan XNY80A | 100 | — | — | — | — | — |
| | Elastollan XNY82A | — | 100 | — | — | — | — |
| | Elastollan XNY84A | — | — | 100 | — | 100 | — |
| | Elastollan XNY88A | — | — | — | 100 | — | — |
| | Elastollan 1190ATR | — | — | — | — | — | 100 |
| | Polyrotaxane | — | — | — | — | 10 | — |
| | Titanium oxide | 4 | 4 | 4 | 4 | 4 | 4 |
| Physical properties | Slab hardness of cover composition (Shore A) | 80 | 82 | 84 | 88 | 84 | 90 |
| | Loss modulus of elasticity of cover composition E" ($\times 10^7$ Pa) | 1.43 | 2.72 | 3.91 | 4.50 | 4.09 | 1.26 |
| | Pencil hardness of cover composition | 5H | 5H | 3H | HB | 3H | HB |
| Evaluation | Moldability of cover | G | G | G | G | G | G |
| | Abrasion resistance | 1 | 1 | 2 | 3 | 2 | 3 |
| | Spin performance on driver shots | 2340 | 2300 | 2240 | 2070 | 2220 | 2330 |

Formulation: Parts by Mass

The raw materials used in Table 3 are shown below.

Elastollan (registered trademark) XNY80A: $H_{12}$MDI based polyurethane elastomer (Shore A hardness: 80) available from BASF Japan Ltd.

Elastollan XNY82A: $H_{12}$MDI based polyurethane elastomer (Shore A hardness: 82) available from BASF Japan Ltd.

Elastollan XNY84A: $H_{12}$MDI based polyurethane elastomer (Shore A hardness: 84) available from BASF Japan Ltd.

Elastollan XNY88A: $H_{12}$MDI based polyurethane elastomer (Shore A hardness: 88) available from BASF Japan Ltd.

Elastollan 1190ATR: MDI based polyurethane elastomer (Shore A hardness: 90) available from BASF Japan Ltd.

(3) Molding of Cover

The core obtained in (1) was concentrically covered with two of the half shells obtained in (2), and the core and two of the half shells were compression molded to form the cover. The compression molding was conducted under the conditions of a molding temperature of 145° C., a molding time of 2 minutes and a molding pressure of 9.8 MPa. The surface of the obtained golf ball body was subjected to a sandblast treatment, and a mark was formed thereon. Then, a clear paint was applied to the golf ball body, and the paint was dried in an oven of 40° C. to obtain a golf ball having a diameter of 42.7 mm and a mass of 45.3 g. Evaluation results regarding the abrasion resistance and spin performance of the obtained golf balls are shown in Tables 1 and 3.

It is apparent from Table 1 that the golf ball according to the present invention has excellent abrasion resistance and spin performance on driver shots. The golf ball according to the present invention is a golf ball having a spherical core and a cover covering the spherical core, wherein the cover contains a polyurethane and the polyurethane comprises, as a constituent component, (A) a polyisocyanate component and (B) a polyol component containing (b1) a polyrotaxane, and wherein (b1) the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group.

The golf ball No. 18 in Table 3 is the case that a mixture of the polyrotaxane and a polyurethane was used for the cover. It is apparent that the golf ball according to the present invention that uses a polyurethane having the polyrotaxane introduced into the molecule thereof has better abrasion resistance than the golf ball No. 18 that uses a mixture of the polyrotaxane and a polyurethane.

This application is based on Japanese patent application No. 2016-104567, filed on May 25, 2016, the content of which is hereby incorporated by reference.

The invention claimed is:

1. A golf ball having a spherical core and a cover covering the spherical core, wherein the cover contains a polyurethane and the polyurethane comprises, as a constituent component,
   (A) a polyisocyanate component and
   (B) a polyol component containing (b1) a polyrotaxane and (b2) a polyol other than (b1) the polyrotaxane, wherein
   (b1) the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group, and
   (b2) the polyol includes two or more polyols and contains at least a low molecular weight polyol.

2. The golf ball according to claim 1, wherein (b2) the polyol is a combination of two or more low molecular weight polyols, or a combination of at least one low molecular weight polyol and at least one high molecular weight polyol.

3. The golf ball according to claim 1, wherein the low molecular weight polyol is selected from the group consisting of ethylene glycol, diethylene glycol, triethylene glycol, propanediol, dipropylene glycol, butanediol, neopentyl glycol, pentanediol, hexanediol, heptanediol, octanediol, 1,4-cyclohexanedimethylol, aniline diol, bisphenol A type diol, glycerin, trimethylolpropane, hexanetriol, pentaerythritol and sorbitol.

4. The golf ball according to claim 1, wherein (b2) the polyol further contains at least a high molecular weight polyol and, the high molecular weight polyol is selected from the group consisting of a polyether polyol, a condensed polyester polyol, a lactone polyester polyol, a polycarbonate polyol and an acrylic polyol.

5. The golf ball according to claim 1, wherein the linear molecule of (b1) the polyrotaxane is polyethylene glycol, and the blocking group of (1) the polyrotaxane is an adamantyl group.

6. The golf ball according to claim 1, wherein the polyurethane contains (b1) the polyrotaxane component in an amount of less than 50 mass %.

7. The golf ball according to claim 1, wherein the polyurethane contains (b1) the polyrotaxane component in an amount of more than 10 mass % and less than 50 mass %.

8. The golf ball according to claim 1, wherein (A) the polyisocyanate component is 4,4'-dicyclohexylmethane diisocyanate.

9. The golf ball according to claim 1, wherein the cover has a loss modulus of elasticity E" of $4.5\times10^7$ Pa or less.

10. The golf ball according to claim 1, wherein the cyclodextrin is an α-cyclodextrin.

11. The golf ball according to claim 1, wherein the linear molecule has a weight average molecular weight ranging from 5,000 to 100,000.

12. The golf ball according to claim 1, wherein (b1) the polyrotaxane has a hydroxyl value ranging from 10 mgKOH/g to 400 mgKOH/g.

13. The golf ball according to claim 1, wherein (b1) the polyrotaxane has a total molecular weight ranging from 30,000 to 3,000,000 in a weight average molecular weight.

14. The golf ball according to claim 1, wherein (b2) the polyol contains butanediol and polyoxytetramethylene glycol.

15. The golf ball according to claim 1, wherein a molar ratio (NCO/OH) of an isocyanate group (NCO) in (A) the polyisocyanate component to a hydroxyl group (OH) in (B) the polyol component ranges from 0.7 to 1.0.

16. The golf ball according to claim 1, wherein a molar ratio (NCO/OH) of an isocyanate group (NCO) in (A) the polyisocyanate component to a hydroxyl group (OH) in (b2) the polyol ranges from 0.8 to 1.2.

17. The golf ball according to claim 1, wherein a cover composition for forming the cover has a slab hardness ranging from 74 to 94 in Shore A hardness.

18. The golf ball according to claim 1, wherein the spherical core has a center hardness Ho ranging from 40 to 70 in Shore C hardness, and a surface hardness Hs ranging from 65 to 100 in Shore C hardness.

19. The golf ball according to claim 1, wherein the spherical core has a hardness difference (Hs-Ho) ranging from 10 to 40 in Shore C hardness between a surface hardness Hs and a center hardness Ho thereof.

20. The golf ball according to claim 1, wherein the cover has a pencil hardness ranging from H to 9H.

21. A golf ball having a spherical core and a cover covering the spherical core, wherein the cover contains a polyurethane and the polyurethane comprises, as a constituent component, (A) a polyisocyanate component and (B) a polyol component containing (b1) a polyrotaxane and (b2) a polyol other than (b1) the polyrotaxane, wherein (b1) the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via —O—$C_3H_6$—O— group, and (b2) the polyol contains a low molecular weight polyol.

\* \* \* \* \*